US007251752B2

(12) United States Patent      (10) Patent No.: US 7,251,752 B2
Adams      (45) Date of Patent: Jul. 31, 2007

(54) COMPUTERIZED PRODUCT IMPROVEMENT APPARATUS AND METHOD

(76) Inventor: Phillip M. Adams, 325 N. Federal Heights Cir., Salt Lake City, UT (US) 84103

( * ) Notice: Subject to any disclaimer, the term of this patent is extended or adjusted under 35 U.S.C. 154(b) by 948 days.

(21) Appl. No.: 09/969,176

(22) Filed: Oct. 1, 2001

(65) Prior Publication Data
US 2003/0065978 A1    Apr. 3, 2003

(51) Int. Cl.
*G06F 11/00* (2006.01)
(52) U.S. Cl. .......................................... 714/38; 705/59
(58) Field of Classification Search ................. 714/38, 714/48, 37, 32, 25, 27; 717/124
See application file for complete search history.

(56) References Cited

U.S. PATENT DOCUMENTS 5,379,414 A * 1/1995 Adams ........................ 714/55
6,532,552 B1 * 3/2003 Benignus et al. ............. 714/25
6,557,120 B1 * 4/2003 Nicholson et al. ............ 714/38

OTHER PUBLICATIONS

NEC Electronics, Inc., "IBM-NEC Meeting for μPD765A/μPD72065 Problem" (U.S.A., May 1987).
Intel Corporation Letter to customers from Jim Sleezer, Product Manager, regarding FDC error and possible solutions (U.S.A., May 2, 1988).
Adams, Phillip M., Nova University, Department of Computer Science, "Hardware-Induced Data Virus (Floppy Diskette Controller Design Flaw)," Technical Report TR-881101-1 (U.S.A., Nov. 14, 1988).
Advanced Military Computing, "Hardware Virus Threatens Databases," vol. 4, No. 25, pp. 1 & 8 (U.S.A. Dec. 5, 1988).
Intel Corporation, "8237A/8237A-4/8237A-5 High Performance Programmable DMA Controller" (U.S.A., date unknown).
Intel Corporation, "8272A Single/Double Density Floppy Disk Controller" (U.S.A., date unknown).

* cited by examiner

*Primary Examiner*—Nadeem Iqbal
(74) *Attorney, Agent, or Firm*—Pate Pierce & Baird

(57) ABSTRACT

A method and apparatus for improvement of computer-related products by an independent developer may solve problems in hardware or software inadvertently, negligently, or intentionally left in products marketed by a vendor. An independent developer may procure access to a product, develop a testing regimen for functionality of the product, and perform evaluations to identify sources of any operational defects found. Accordingly, the developer may then provide a generalized testing regimen to test instances of product provided by a vendor, identify those containing the flaw, and may optionally provide a solution to the flaw, where practicable. The independent developer may obtain intellectual property rights in the testing, solution or both for the product. Thus, by notifying a vendor, an independent developer may become a supplier of testing or solution systems, motivating a supplier by one of several mechanisms. The developer may obtain a legal status with respect to the vendor by becoming a customer or user, in order to provide motivation to a recalcitrant vendor not designed to take responsibility for defects known and continued in marketed products.

28 Claims, 10 Drawing Sheets

COMPUTERIZED PRODUCT IMPROVEMENT APPARATUS AND METHOD

BACKGROUND

1. The Field of the Invention

This invention relates to computerized methods for testing and tracking and, more particularly, to novel systems and methods for testing, tracking, and correcting errors due to software or hardware.

2. Background

Product development cycles have become shorter and shorter. More of the responsibility for testing and "debugging" products falls to the actual beta testers or alpha testers. Nevertheless, products are continuing their development cycle well into their marketing bases.

For example, software is often released for public purchase before the known errors from beta testing have been cured. Hardware is often likewise premature, and more difficult to correct. Alternatively, beta testing may be inadequate, leaving various problems extant within either hardware, software, or a combination thereof.

Purchasers are often left with a need for identification and cure of errors in commercially available software and hardware. In some instances, product manufacturers and suppliers actively solicit comments, improvements, detection and identification of errors, and the like. In other situations, manufacturers and marketers of products are not so forthcoming.

For example, occasionally, problems are comparatively esoteric, and may occur only in a few rare conditions or instances. Nevertheless, some errors occur with sufficient regularity as to seriously encumber users unaware of the existence of such product flaws.

In recent years, computer and software manufacturers have been repeatedly surprised, even amazed, at the groundswell of opposition to products that are not adequately tested, supported, corrected, recalled, or otherwise identified as having correctable flaws.

Software, in particular, has arrived at a new threshold of pain for purchasers and users. Never since the advent of government agencies for consumer protection against fraud, product failure, product inadequacy, manufacturer non-responsiveness, and the like, have so many dollars of product value been subject to such massive amounts of owner and operator time in order to obtain the purported benefits of the products.

Some manufacturers are swift to seek out and post notification of errors existing in their products. Typically, errors are identified, with associated patches for correcting the errors. In some cases, products are recalled. With the advent of the world wide web, a host of users may provide a corresponding host of error corrections, all freely available to users interested in improving the performance or reliability of a purchased software or hardware product in the computer industry.

Historically, a manufacturer or other purveyor of a computer-related product may face a dilemma with respect to certain product flaws. To the extent that an error, built into or programmed into a computer-related product, is comparatively esoteric and unlikely to cause problems for the majority of users, a manufacturer or developer may prefer to ignore it. To the extent that such a flaw or error is ubiquitous and likely to cause pervasive and obvious problems, a manufacturer may prefer to cure the problem. Similarly, to the extent that a problem is likely to cause a comparatively small disruption of promised service, a manufacturer may choose to ignore it. Alternatively, to the extent that a problem is likely to cause serious economic damages to a commercial or industrial user of a software product or physical damage to persons or property as a direct result of the failure of a computer-based product, a manufacturer will take appropriate steps to find a correction to the problem, announce the presence of the flaw and the availability of a corrective measure, and seek to bring all copies of the product into compliance with a corrected version thereof.

Nevertheless, product improvement is largely a matter of motivation. Motivation may arise from personal interest, individual or enterprise-wide frustration, desirability of a result, previous experiences and expectations, and the like. In current process for product improvement, little incentive exists to provide for skilled third parties to improve marketed products. By the same token, manufacturers, whether large or small, may have limited motivation, resources, or the like to locate and correct errors. In fact, a certain motivation may exist to not seek out errors, nor to highlight them, nor even to repair them, in many instances.

What is needed is a mechanism, whereby software and hardware products related to computer systems may be improved profitably by third parties. Likewise, what is needed is an apparatus and method for consistently providing the necessary resources for testing, correction, notification, and product redistribution for products and upgrades related to computer-related based products, whether software or hardware.

BRIEF SUMMARY AND OBJECTS OF THE INVENTION

In view of the foregoing, it is a primary object of the present invention to provide a method and process for improving products, and particularly computer-related products by independent third parties. In certain embodiments, apparatus and methods in accordance with the invention they include obtaining a product from a vendor, the product containing a processor, and testing the product for functionality and for defects in operation. Evaluation, after finding a defect, may include testing to determine a source for defects located in the product. Thereafter, a testing regimen may be developed to instances of the product containing the defect or fault.

Consistent with the foregoing objects, and in accordance with the invention as embodied and broadly described herein, a method and apparatus are disclosed. Certain embodiments of apparatus and methods in accordance with the invention may include solutions to hardware defects, software defects, or both. In certain embodiments, a method and apparatus in accordance with the invention may provide solutions in hardware or software effective to return a defective part to service, in order to serve without having the defect, or without having the condition exist giving rise to the defect.

In certain embodiments, the faulty product may be hardware or software. In certain preferred embodiments, the solution to faulty hardware defects may be provided by software configured to override, circumvent, or otherwise avoid states or conditions of the hardware giving rise to the defect. Thus, the defective operation of the hardware may be avoided by implementation of software in accordance with the invention.

In certain embodiments, a third party may assess a defect and a number of products, or the types of products affected by the defect in manufacturing or design, in order to provide a severity profile reflecting the extent to which the product has been distributed, or to which damage may have occurred to purchasers of the product. A third party, possessing information related to the severity profile corresponding to a defect, as well as methods of testing and optionally curing defects in products, may notify a vendor and develop a liability profile reflecting the extent to which a vendor may be responsible for the defect, with knowledge, or as a result of negligence.

Since some defects may affect the health or lives of persons, liability may be extreme, and may relate primarily to numbers of failures, independent of knowledge. In certain embodiments, a method may include providing a solution to a vendor in order to correct defects in products manufactured and provided by the vendor. Solutions may be selected from modifications to the product, instructions sets provided to a vendor, to a user, or to both, instructing on the steps for curing the defect, or publishing a solution to be implemented by an owner (e.g. user) who has or may purchase the product.

In certain embodiments, solutions may be entitled to intellectual property rights. Similarly, testing processes and methods may be entitled to intellectual property rights. Accordingly, in certain circumstances, it may be appropriate that the process will include obtaining intellectual property rights. Subsequent licensing of intellectual property rights may be directed to purchasers of products or owners of products having a desire to individually license, or may involve licensing to vendors of defective products in order to correct defects in stock or previously sold instances of the product.

In certain circumstances, a third party developer of testing processes and apparatus, or solution apparatus and processes, may take steps to obtain a legal relationship with a vendor, thus imposing a duty on the vendor to the third party. In this manner, a third party provider may become a second party with respect to a vendor as a first party in a legal relationship giving rise to rights and remedies to the formerly third party developer of solutions and testing.

A developer may provide information identifying a defect to a vendor, and, if available, existence of a solution available to the vendor. Thus, a vendor may be motivated to purchase and provide a test to users, or solution. For example, if a vendor cannot solve a problem, and desires only to recall, then a testing regimen may be extremely important.

Alternatively, if a solution exists, then a field repair may be executed by a user, by an agent of a vendor, or other entity in accordance with the provided solution. Thus, a vendor may be motivated to provide testing or repairs in order to maintain customer satisfaction. In the event that a vendor is unconvinced of the risk, cost, liability, and so forth of leaving users unsupported against an embedded defect, the developer may demand that a vendor, cure the defect from a position of a legal relationship established as a customer, or the like.

In one embodiment, a process may include entering into an agreement and monitoring compliance of a vendor with the agreement in curing defects in accordance with obligations under the agreement. Alternatively, a developer may provide motivation from any suitable quarter including providing motivation to acknowledge and cure defects by taking steps toward obtaining a legal judgment. For example, a developer may file suit, may provide information to those positioned to file suit, or may take a status placing the developer in a position to file suit to enforce an agreement, or to motivate a vendor to enter into an agreement.

In certain embodiments, an apparatus and method in accordance with the invention may be embodied principally in hardware. In other embodiments, the solution may be embodied in software. In certain instances, a defect embodied in the hardware may actually be solved by a solution embodied strictly in software. In this kind of instance, careful programming may be able to circumvent certain hardware activities, by selective execution of test instructions, provision of data, or other activities that may trigger activities by a processor, thereby allowing intervention by software in the conventional operation of hardware. Thus, a hardware problem may actually be solved entirely by a software solution. In certain embodiments, a process in accordance with the invention may be embodied in a set of data structures providing operational data, executable data, or both configured in a computer-readable medium to be executable by a processor.

In certain instances, a vendor may acknowledge a problem, yet assert its own ability to detect a defect and cure the defect. In such an instance, a developer may contract with a vendor, causing the vendor to provide an alternative solution, and warrant the validity of the solution to provide a test and warrant the validity of the test. In such an event, a developer may continue to procure and test products provided by the vendor in order to monitor compliance and assure compliance with the agreement.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 10, is not intended to limit the scope of the invention, as claimed, but is merely representative of the presently preferred embodiments of the invention.

The presently preferred embodiments of the invention will be best understood by reference to the drawings, wherein like parts are designated by like numerals throughout. Those of ordinary skill in the art will, of course, appreciate that various modifications to the structures detailed in the Figures may easily be made without departing from the essential characteristics of the invention, as described. Thus, the following description of FIGS. 1-10 is intended only by way of example, and simply illustrates certain presently preferred embodiments consistent with the invention as claimed herein.

Figure 1:
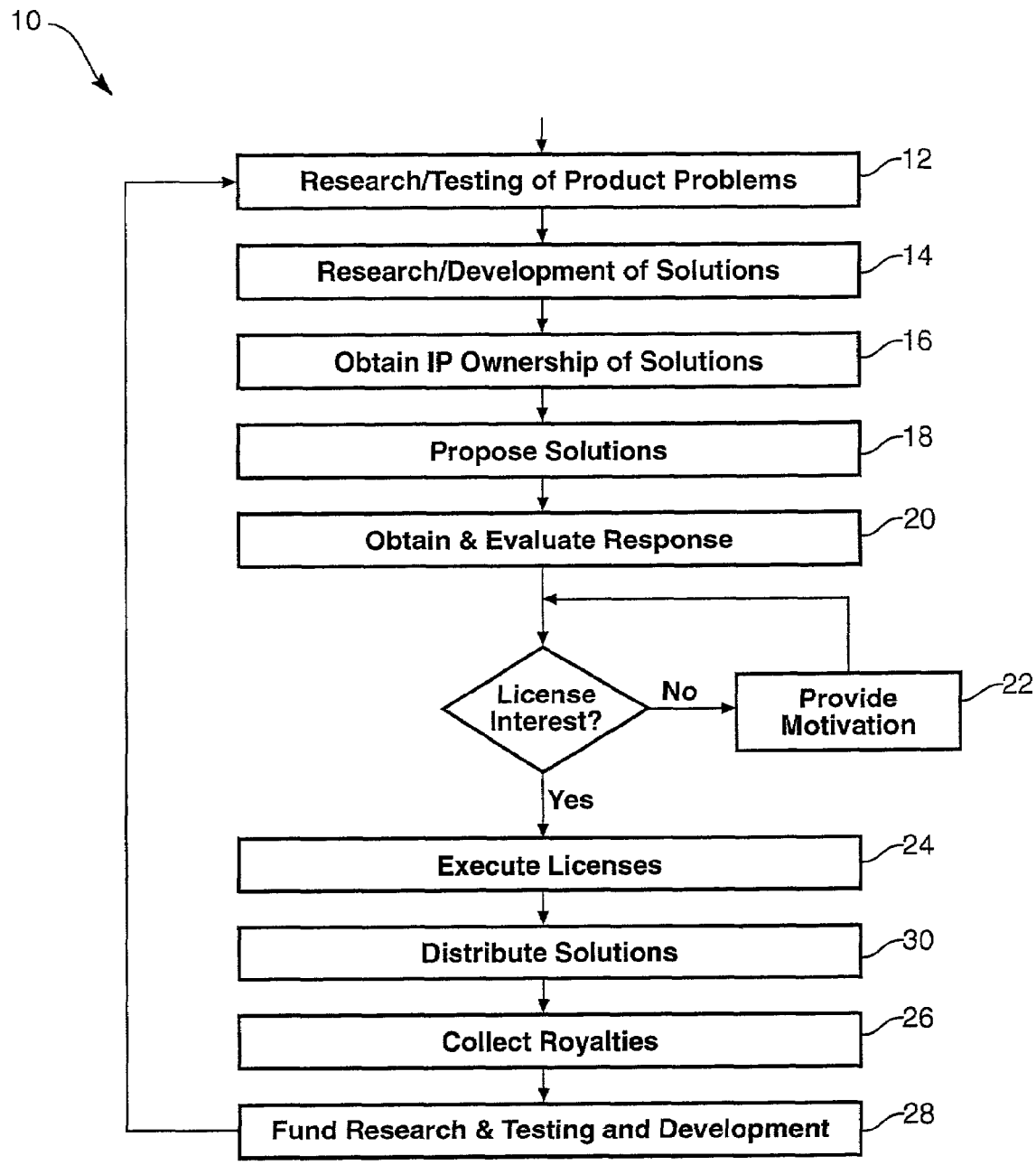
FIG. 1 is a schematic block diagram of one embodiment of a process in accordance with the invention.

Referring to FIG. 1, a process 10 may be embodied as one or several steps. The steps may be executed multiple times, and some steps may be executed in the order illustrated, or in another order as appropriate.

Nevertheless, a process 10 may include an evaluation process or step 12, a development step 14, a securement 16 of intellectual property related to solutions, a proposal 18 proposing solutions to an original vendor, manufacturer, provider, or developer of a product under study, and an evaluation 20 of a response obtained from the responsible party originally providing the product in questions.

In general, research, testing, evaluation, and the like may be embodied in a step 12 regarded as an evaluation 12. Evaluation, involves evaluation on the merits of a product designed, configured, fabricated, constructed, or otherwise put forth as capable of providing some functionality or implementing some duty on behalf of an owner or user. Testing in modem hardware and software systems in sometimes extensive, and sometimes adequate. That is, testing may be extensive and yet inadequate in much of the software and hardware available in the marketplace.

In other instances, standardized testing is available, but the commensurate skills are not implemented or otherwise applied to the problem. By whatever mechanism, products may be placed in the marketplace by vendors, suppliers, manufacturers, developers, and the like obtaining money for those products, whether hardware or software. The products may or may not comply with the fundamental functionality expected by an owner or purchaser. Likewise, the promised functionality may exist, but may have failures periodically or at various times.

In other circumstances, a condition imposed by a user may create a condition not foreseen by a manufacturer, vendor, supplier, or developer, thus causing either a failure of the product to provide the intended solution or functionality, or a failure of the product in some other mode. A failure by a product in a mode not testable, or known to a user, may lead to consequential damages to the user of the computer.

For example, in certain instances, a user may have a program crash, or a program may create bad information or data from an analysis, or other process. Likewise, a product, such as a computer may be responsible to provide information, which information may be provided inaccurately, to a wrong location, or the information itself may be wrong. In financial information, failure of a computer to provide correct financial information may cause a failure of a transaction, or more significantly, an incorrect transaction, not detected by the system itself, due to some flaw therein.

A process of development 14 may involve research, development, or any of the technical processes normally associated with preparing solutions to a problem. Whereas the evaluation process 12 involves identification of the existence of problems, as well as identification of the source of such problems, the development process 14 involves finding and implementing methodologies for temporarily or permanently resolving or avoiding problems identified by the evaluation process 12. Some of the potential outcomes of a development process 14 may be alternative software, testing programs, hardware patches, software applications suitable for circumventing hardware problems, and the like.

In certain embodiments, a development process 14 may fail, requiring users to either suffer through with a flaw, or avoid using a product in certain conditions. Alternatively, where a flaw goes to the fundamental purpose of a product, a failure in the development 14 of a solution may require that a test be done to determine which products must be recalled and replaced.

In certain embodiments, the development process 14 may involve development of a testing regimen. For example, the evaluation process 12 may identify failures of a system to perform adequately, or to perform consistently, or without adverse impact on the systems in which the product is embedded or relied upon. In such a circumstance, the development process 14 may be unable to use, or the testing regimen may be impractical to use for an individual user, or for anyone in the field. Accordingly, the development process 14 may develop a testing regimen or application suitable for distribution for use by service people, users, owners, and the like in order to identify products that would contain flaws found during the evaluation process 12.

As a consequence of the development 14, new methods, processes, applications, hardware, and the like may result. Accordingly, a securement process 16 or securement step 16 may secure to an independent developer, independent from the original providers, manufacturers, sellers, and so forth associated with the product in question, the intellectual property rights to proprietary tests, solutions, and so forth developed during the processes of evaluation 12 and development 14. Intellectual property ownership may include patents, certifications, copyrights on materials, and so forth. The securement step 16 maybe ongoing and may involve one or more products, depending on the applicability of the testing regimen, solutions methodology, hardware, software, and so forth.

In accordance with one embodiment of a method and apparatus in accordance with the invention, a proposal step 18 may involve presentation to entities responsible for sales, distribution, manufacturing, and so forth of a subject project. The presentations may provide information regarding the evaluation process 12, the development process 14, outputs resulting from evaluation 12 and development 14, presentation of proposed solutions, presentation of data, and additional information relating to business issues.

For example, during the evaluation step 12, a technical evaluation of a product, its failures, and the sources of its failures may be augmented by business or industrial data relating to the prevalence of such defective products, the prevalence of the type associated with the defective product, and so forth.

Accordingly, the proposal 18 may involve providing the context of the problem, the context of the business implications of the product to those involved in the manufacturing, supply, and distribution chain, as well as the possible, probable, or likely implications of the failure of the product with respect to the businesses that rely on the product. For example, it is very likely that a failure of a significant product in some aspect of its conventional or expected performance may give rise to consequential damages against parties knowing the significance, importance, and reliance associated with the product provided.

Whether the proposal 18 is provided as a report, a paper, a letter, or a discussion, an evaluation 20 of the response obtained may be in order. For example, a party or entity in the distribution chain may be more or less believing. Likewise, such an entity may be more or less concerned by the degree of liability. A company may regard liability as extreme and the probability of the liability ever arising comparatively small. Likewise, a company may regard the probability of the fault being detected very high and the net liability low. Accordingly, various responses may be provided for evaluation 20.

Accordingly, the evaluation 20 may lead to a test 21 determining whether or not a licensing interest exists on the part of a particular party in the distribution chain associated with the product. If no licensing interest exists, then a motivation step 22 may be appropriate.

For example, a company may need to understand the position of competitors. Likewise, the position of purchasers may be significant. In some events, only a threat of legal action will be found persuasive. In the legal arena, action may be based on the risks to a purchaser, class action based on risk to a class of purchasers, a false claims act based on providing faulty products to government agencies, with a degree of negligence, false representations, or knowledge of defects, and the like.

Following the proposal 18, parties notified of the defects, the ability to detect defects, and possibly the ability to cure defects are on notice that further providing of faulty products is thereafter done with knowledge.

Accordingly, at a minium, future products should be corrected. Previous products, provided without knowledge of the defect, or knowledge of and ability to detect to cure the defect, may provide less liability. Accordingly, either through persuasion, additional information, combining of additional statistics, proposing solutions to other downstream entities within the supply chain, or the like may provide motivation 22 encouraging a license interest satisfying the test 21. Similarly, legal action may be part of the motivation 22 provided to a responsible (liable) entity within the supply chain corresponding to a subject faulty product.

On the other hand, once the test 21 is answered positively, execution 24 of a license, or licensing 24 may proceed. Licensing may involve licensing of any or all rights to intellectual property associated with testing, solutions, or the like arising out of the evaluation step 12 or development step 14. In some instances, the licensing process 24 may include settlement of legal actions arising out of the motivation step 22. Accordingly, licensing 24 may be a generalized agreement process 24 in which threatening motivations from the motivation process 22 are removed, as part of the overall exchange of value between the independent developer and the entity in the supply chain having liability.

In accordance with the licensing process 24, the supplying entity may distribute solutions 30. In certain embodiments, the liable parties in the supply processes may prefer that the third-party developer responsible for the development process 14 provide the distribution step 30. By whatever means, the third-party developer collects royalties 26 based upon the distribution 30 of solutions.

In this context, solutions may be merely tests, applications to conduct tests, information on how to conduct tests, software for solving a problem, hardware patches, and the like. Any combination of solutions which tends to ameliorate the problem caused by the effective product may be embodied in a solution distributed 30 to users and owners of defective products previously distributed. Similarly, distribution 30 may involve distributing solutions to those holding stocks of faulty products, and to those parties still in the process of manufacturing products which might otherwise be faulty without the solutions provided.

Distributing 30 may also involve recalling products. Accordingly, royalties 26 flow to the developer as a consequence of the value provided in the solutions distributed 30. In one embodiment, a process 10 may include a funding step 28 in which all or a portion of royalties collected 26 are fed back into an evaluation step 12 to research, test, evaluate, and otherwise assess other products, as well as possible compliance issues with respect to products embodying the solution under license.

Figure 2A:
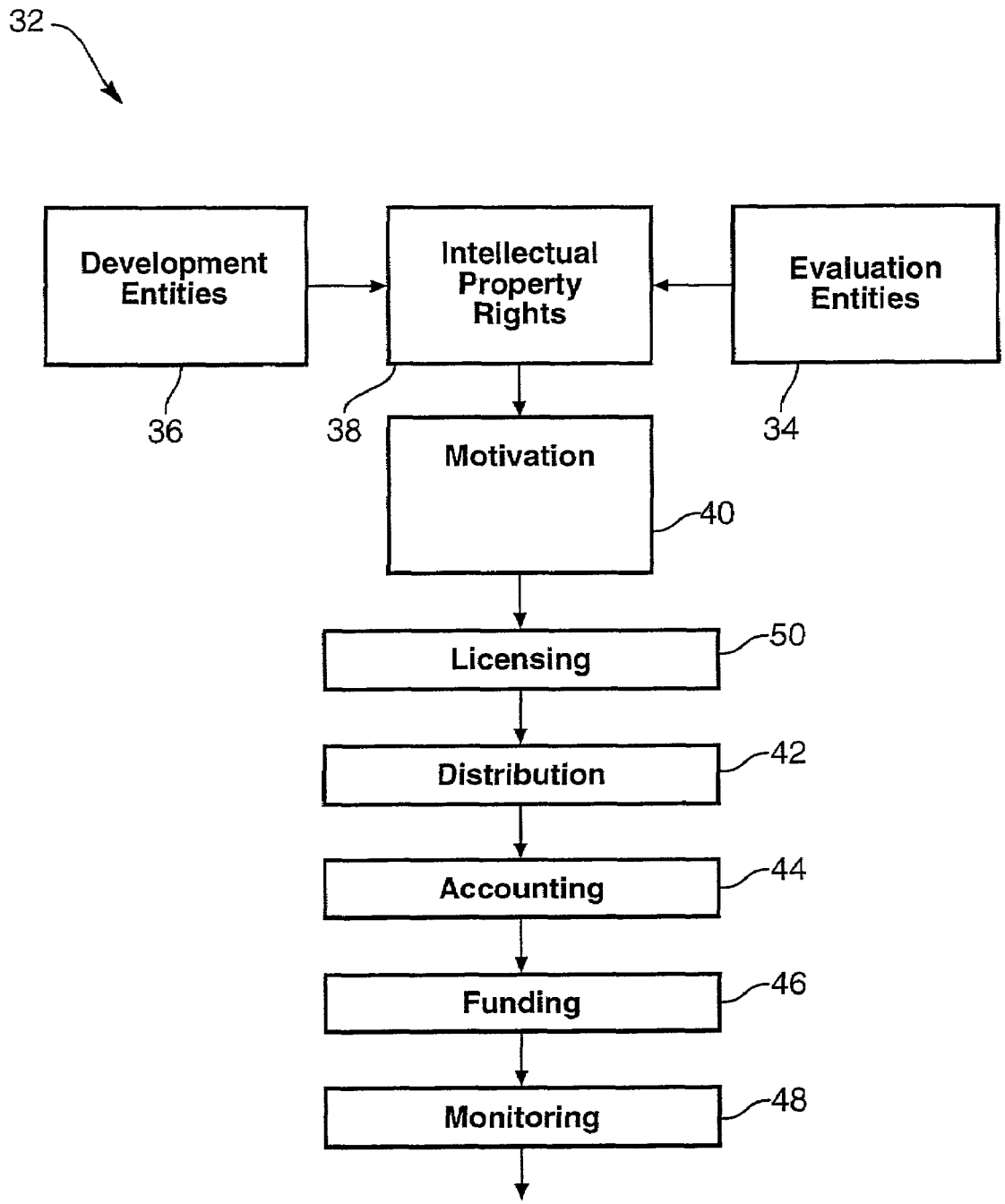
FIG. 2 is schematic block diagram of an alternative embodiment of a process in accordance with the invention.
Figure 2B:
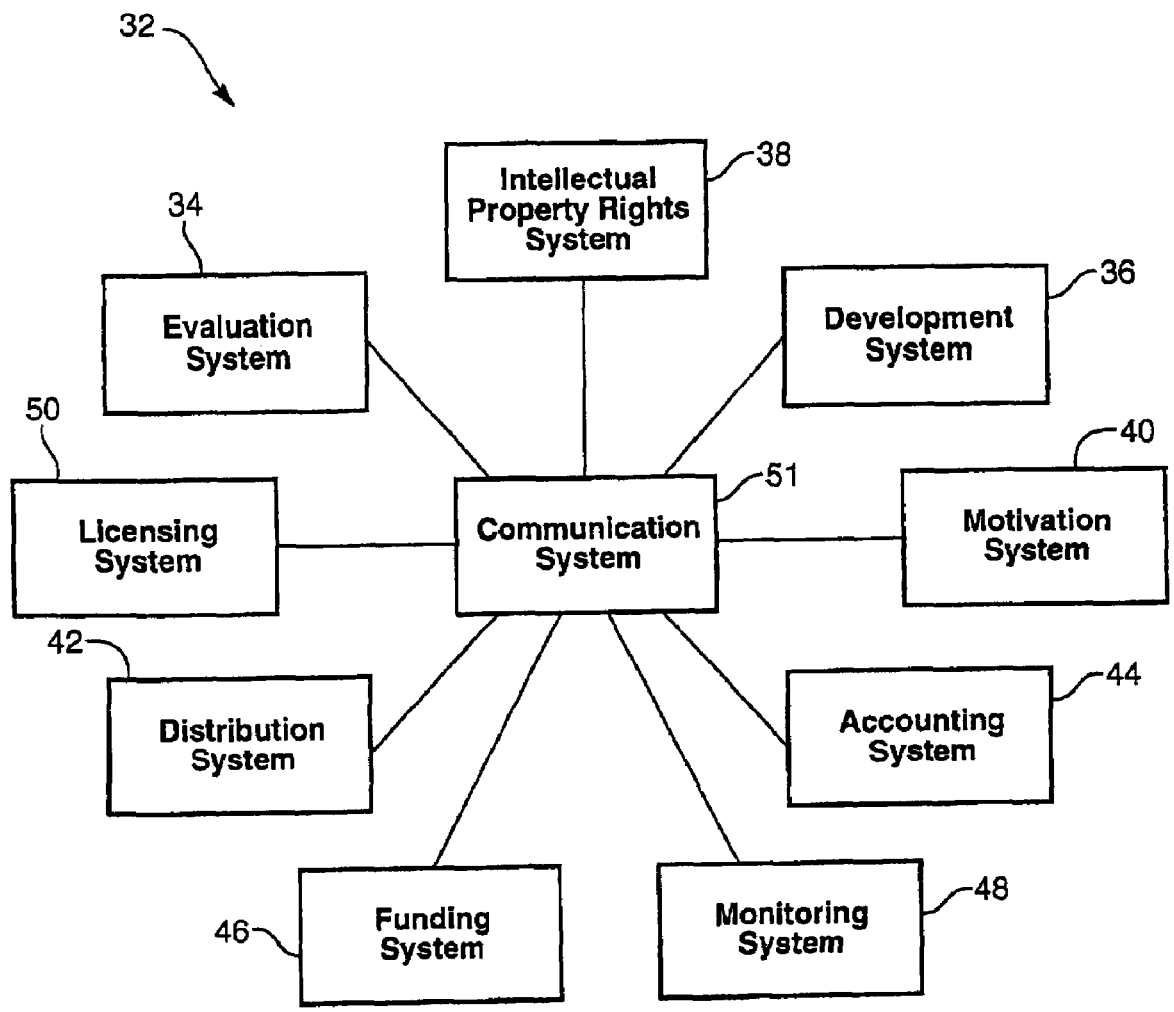

Referring to FIG. 2, embodied in two architectures as FIG. 2A and FIG. 2B, the relationship between entities or systems may be thought of in a variety of ways. To a certain extent, sequential relationships may apply. Nevertheless, in an ongoing process, involving multiple defects, multiple products, multiple companies, or the like, more of a freeform continuing communication architecture may exist.

Referring to FIG. 2A, an evaluation entity 34 may involve a private party, such as an independent third-party tester or developer. Alternatively, an evaluation entity may be a public entity. Possible organizations or entities that may serve as evaluation entities 34 may include organizations such as the Underwriters Laboratory, or an organization responsible for consumer reports and similar publications. The Consumer Product Safety Commission of the United States government, or similar agencies of state governments may serve as evaluation entities 34. Public interest research groups may be evaluation entities, as may any private company, or foundation, or so forth. Ultimately, evaluation entities 34 may identify problems, and may participate in some aspect of an evaluation process 12. Identifying a problem or defect in a product may be a part of an ongoing process and may be aimed at recall, recommendations, or any other purpose. In one embodiment of a process in accordance with the invention, the evaluation step 12, regardless of its motivation, may result in knowledge becoming available regarding defects in products.

Development entities 36 may or may not be associated with the evaluation entities 34. Development entities 36 may be manufacturers in a conventional sense who try to improve their own products in response to evaluation processes 12 conducted by evaluation entities 34 within the manufacturing and distribution chain, or from outside. However, the development entities 36 may just as well be independent third-party developers who are more skilled, or more motivated, and free from the daily routine pressures of those in the manufacturing and supply chain associated with the product.

Accordingly, the development entities 36 may develop their own methodologies for solving problems in a more elegant manner. For example, an evaluation entity 34 may recommend recall of a product. By contrast the development entity 36 may provide a solution that allows for correction of a problem with a product, without recall.

Or, at a minimum, the development entity 36 may provide a solution which can be distributed in association with a recall, greatly reducing the cost of actual recall from acquiring service by manufacturers or suppliers to simply distributing to registered owners a solution package. By either entity 34, 36, intellectual property rights may develop from either testing regimen, solution techniques, production alteration, solution application, or the like. Thus, intellectual property rights 38 may be developed and captured through appropriate registrations, applications, and the like.

In general, some mechanism, including at least motivation 40 by way of information, and possibly including one or more of the steps from the process 10 in FIG. 1, may lead to a licensing entity 50. A motivation entity 40 may often be the development entity 36. Meanwhile, the distribution system 42 or distribution entity 42 may be the parties in the manufacturing and supply chain, or the development entities 36, or even simply the evaluation entities 34, such as any case where information alone is sufficient to be distributed.

Accordingly, licensing entities 50 may involve those giving licenses, those receiving licenses, and those providing the licenses or creating the licenses and negotiating them. Similarly, the distribution entities 42 or distribution system 42 may comprise many different entities involved in having either information, testing applications, solution applications, hardware fixes, and the like distributed to users and owners of defective products.

Accounting systems and entities 44 may provide for tracking of distribution in order to provide funding by way of royalty collection 26, and the like. Similarly, monitoring 48 of compliance of responsible entities with the licensing 24 and with the correction of defects in accordance with solutions and testing, may be provided. Again monitoring entities or systems may involve one or more entities from the entities within the manufacturing and supply chain, to the entities within the evaluation establishment 34, to the development entities 36 who stand to gain by proper accounting and collection of royalties. Thus, funding systems 46 may involve processes and entities from multiple locations in order to execute them completely.

Referring to FIG. 2B, the processes 32 or entities 32 may be thought of as systems 32. Systems 32 may involve entities, processes, information, applications, and the like configured to accomplish the task. Accordingly, the communications system 51 may be of any type required in order to provide effective communication between an evaluation system 34, development system 36, an intellectual property rights system 38, and a motivation system 40.

Similarly, a distribution system 42 may include various entities, computer systems, information systems, and a communication system 51 as well as internal communications with respect to the distribution system 42. The distribution system 42 may provide distribution of information and solutions, or information and testing applications, and the like. An accounting system made up of entities and relationships, together with their processes and communication hardware and software may provide the accounting system 44. A funding system 46 may operate by any suitable method to provide effective funding of evaluation processes 12, development processes 14, and the like.

Monitoring system 48 may involve various entities, whether evaluation entities 34, or other entities. For example, the various entities may have those having access to licensing information from the licensing entities 50, accounting information from accounting entities 44, and may be related to funding entities 46 or systems 46 associated with the funding processes.

Figure 3:
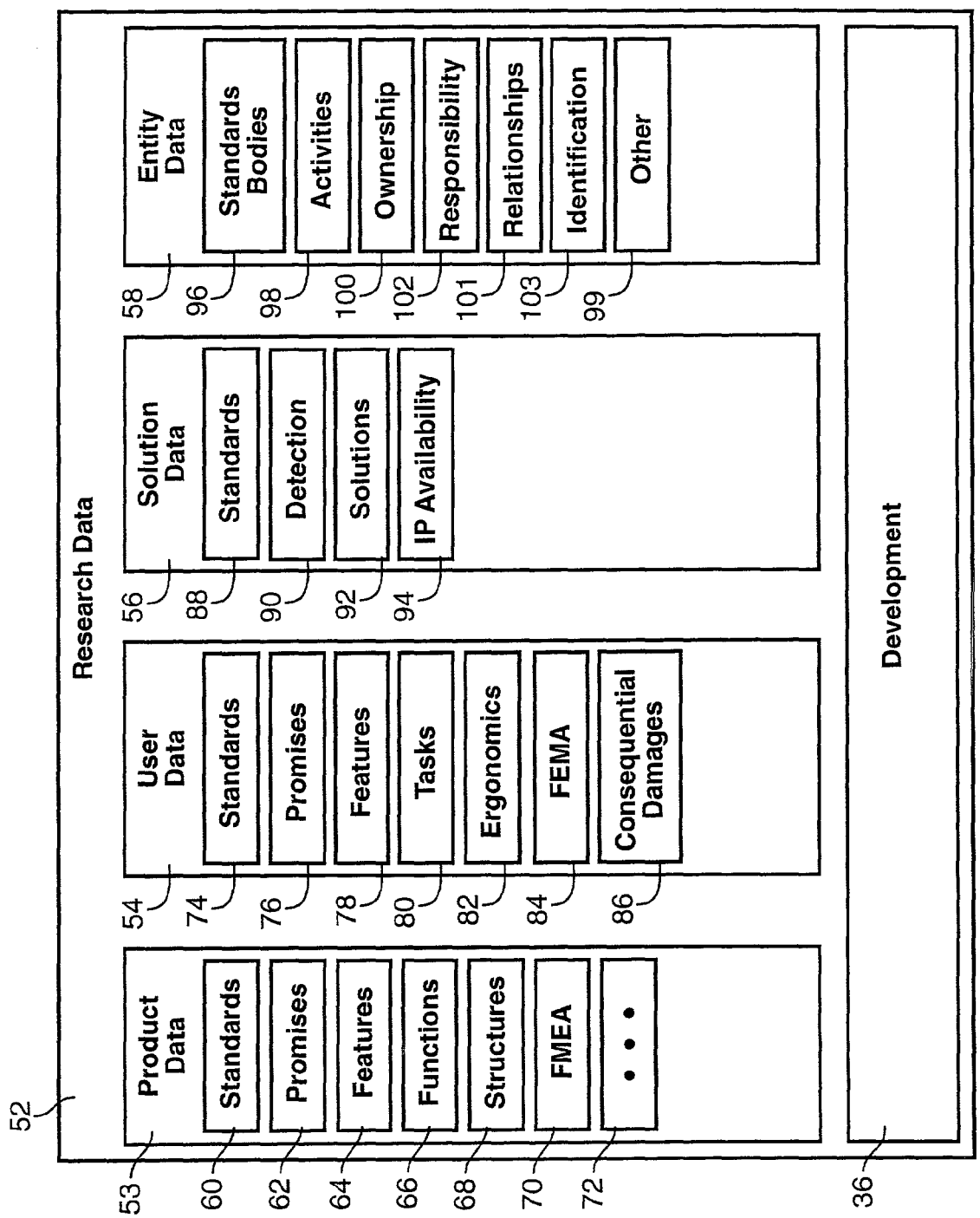
FIG. 3 is schematic block diagram of data structures suitable for implementing an apparatus and process in accordance with the invention.

Referring to FIG. 3, any of the processes of evaluation 12, development 14, intellectual property ownership 16, licensing processes 24, motivation steps 22, and the like may benefit from research data. That is, technical information regarding products, technologies, business, distribution, and the like may be important or required.

In general, a development system 36 may include entities, information, computer programs, databases, and the like. The resulting inputs and outputs from development entities 36 or development systems 36, as well as the inputs and outputs from evaluation entities or systems 34 may be provided as inputs or outputs with respect to evaluation processes 12 and development 14 of solutions. The result of such information, or perhaps a requirement, may be databases or a database of research data 52. In general, research data 52 may include product data 53, user data 54, solution data 56, and entity data 58.

For example, product data 53 may include standards 60 governing a product in question. Similarly, advertising, contracts, and the like may give rise to promises 62 that become imputed or explicit obligations upon sellers, distributors, manufacturers, and developers associated with a subject product. In general, the product data 53 may be regarded as technical data. Nevertheless, promises 62 may be thought of as legal information regarding liabilities or obligations undertaken by entities within the distribution process of the subject product.

Similarly, product data 53 may include various features 64. The features 64 may be advertised features, required features, legally regulated features, or the like. However, the features 64 may typically be those features that are regarded as having commercial value giving rise to expectations and obligations.

Likewise, functionality 66 may be thought of as performance requirements. Features 64 may or may not relate to technical performance, whereas functions 66 will typically relate directly to the principal reason for the existence of a product. Accordingly, the functionality associated with function 66 to which a product is supposedly suited, may be critical.

Likewise, structures 68 may involve mechanical structures, data structures whether executable code or operational data stored by, as a result of or in the process of operation of a subject project, and may be documented by manufacturers, users, and the like. Accordingly, the structures 68 corresponding to a product may be thought of as those intentionally structured elements corresponding to a product, which are responsible for providing the functions 66, the features 64, or both, associated with a product.

Data concerning failure modes and effects analyses 70 may be important. One of the functions of an evaluation process 12 is the determination of various modes of failure, and the effects thereof. Typically, failure modes and effects analysis 70 is thought of as an engineering and functional issue. Nevertheless, in the broader context of businesses and legal liability, failure modes and effects analysis 70 may propagate information beyond the strict function of structures, and relate to the consequential damages or probable effects flowing to businesses as a result of the failure modes of a product. Additional project data 72 may exist as appropriate to a product and the industry it serves.

User data 54 may likewise include standards 74. Many standards 74 are regulated by governments. Other standards are contracted by virtue of either contracts themselves, or by virtue of standardized practice within an industry. Thus, standards 74 may exist, and can be very important with respect to the evaluation processes 12. Similarly, promises 76 understood by users may be significant user data 54. Likewise, promises 76 may not be generic and associated strictly with the product, but may rather be associated with a particular user. As product costs increase, and sophistication of users increases, promises 76 may be more narrowly associated with a user, as user data 54, than with a product, as product data 53.

Likewise, features 78 may be unique to a user, since much of commercial software, hardware, equipment, and the like is customized with features for a particular application, meaning a particular use by a particular purchaser. Likewise, tasks 80 may be associated with a user and relate a user to a product. Ergonomic considerations 82 may again be related to the tasks 80, but will typically be a relational data source relating a user corresponding to the user data 54, to a product, corresponding to the product data 53. Again, failure modes and effects analysis 84 associated with users in general, and a specific user, may exist as user data.

For example, failure modes and effects analysis 70 of a product may relate to failure of other additional equipment. Failure modes and effects analysis 84 may relate to the consequential damages or effects on a user. Accordingly, damages 86 may actually be a measure of physical or financial damages, related to a user 54, as opposed to a product orientation, as with product data 53.

Solution data 56 may include appropriate standards 88, detection methods, processes, and equipment, collectively referred to as detection data 90, and the like. That is, in general, detection data 90 may be modest or extensive. However, detection data 90 may be critical to the process of effectively identifying and curing defects across a general population of users of equipment found defective, or software applications found defective.

Likewise, solution data 92 may include any information related to provision of a solution. Typically, the solution data 92 will be used by, and provided by a development process 14 associated with development entities 36. Accordingly, solution data 92 may be inputs or outputs to the development process 14 or development entities 36 seeking to solve a problem and provide a solution thereto.

Solution data 56 may include intellectual property information 94, particularly relating to the existence, nature, and availability of intellectual property protection for any of the processes and apparatus associated with solution data 92, and the like.

Entity data 58 may include information relating to various entities. For example, standards bodies abound and regulate much of engineering, commerce, consumer relations, and the like. Accordingly, the data 96 of standards bodies may be significant. The standards bodies data 96 may include information on the entities, as well as information on the responsibilities. Likewise, the standards bodies data 96 may lead directly to provision of the standards data 60, 74, 88 associated with either product data 53, user data 54, solution data 56, or any combination thereof.

Similarly, activities data 98 associated with entities 58 may relate to official activities, unofficial activities, commercial activities, regulatory activities, and the like.

Accordingly, activities data 98 may relate to responsibilities, undertakings, interests, willingness to engage in support or regulation, willingness to provide useful information, willingness to implement remedies, and the like. Similarly, ownership data 100 may be significant, even critical, to identification both of users and owners of defective products, as well as the responsibility chain or liability relationships of various entities in the manufacturing, distribution, and marketing processes related to defective products.

Accordingly, ownership data 100 may be extremely important to an overall resolution of product defects by independent third parties operating as development entities 36. Thus, responsibility information 102 may actually relate to both ownership data 100 and to legal theories of responsibility, liability, and the like imposed by means of regulation, statute, contract, and the like. Thus, responsibility data 102 may provide linkages to various entities associated with various aspects of providing and operating products. Responsibility data 102 may extend to ownership data 100 associated, not only with ownership of factories and plants providing products, but with factories and plants using products after notification of defects.

Similarly, relationship data 101 may include legal, commercial, engineering, analytical, and other relationships by which entities may interact. Likewise, identification data 103 may be standard addresses, telephone numbers, other contact information, or relationships that may be hidden. For example, identification data 103 may include identification information relating to entities, relating to products, relating to batches, relating to lots, and the like, as required to link entities with products, link products with products, link products with processes, and so forth establishing the standards bodies data 96 that is appropriate, the ownership data 100 that applies throughout the manufacturing, distribution, and use of defective products, and the responsibility chains 102 that may exist between any entities. Other data 99 deemed useful regarding various entities may also be stored as appropriate.

Figure 4:
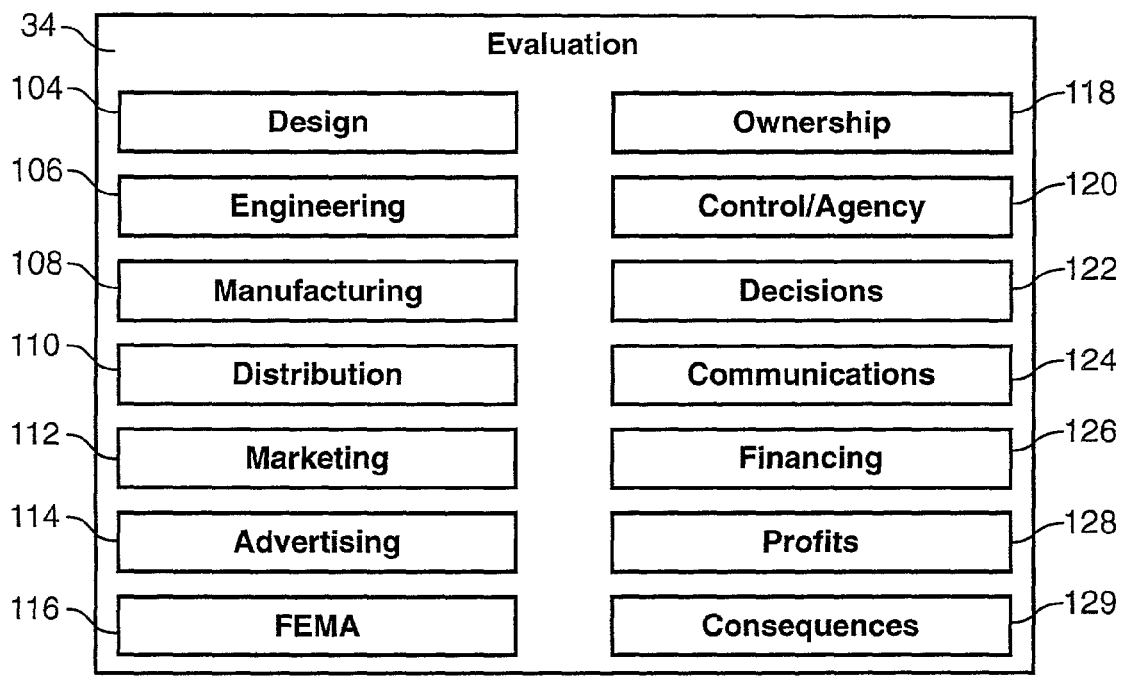
FIG. 4 is a schematic block diagram of additional data structures, particularly adapted to support evaluation in accordance with a method consistent with the invention.

Referring to FIG. 4, an evaluation system 34 or evaluation entity 34 may include numerous subsystems. The subsystems may also be thought of as sub-entities, or sub-functions. Thus, the evaluation system 34 may be thought of as describing either a system of entities and their interactions, the functionalities, the interactions, or all of the above. Thus, in general, an evaluation system 34 may include design 104 corresponding to and responsible for providing product design. Design 104 typically provides aesthetics and ergonomics associated with making a product pleasant, useful, and the like. By contrast, engineering 106 is typically responsible for providing specification and functional analysis. In an evaluation system 34, design 104 may be dedicated to evaluation of design features. Similarly, engineering 106 made to be focused on the engineered aspects of a defective, or suspected defective product.

Similarly, manufacturing 108 may be responsible for evaluation 12 of manufacturing processes and materials in a product. Similarly, distribution 110, marketing 112, and advertising 114, may all be invested in one or more persons, entities, systems, databases, and the like in order to evaluate distribution, marketing, and advertising, respectively, corresponding to a defective product. Often, the major education or communication processes of industry relate to the distribution 110, marketing 112, and advertising 114 entities within a manufacturing or distribution process. In the evaluation entity 34 or evaluation system 34, the entities 110, 112, 114, are responsible for providing the data and evaluation thereof corresponding to these functionalities.

Similarly, a failure modes and effects analysis entity 116 may evaluate, by any suitable means, whether with data or actual products, to properly evaluate 12 a product, or its performance in failure modes anticipated.

From a business point of view, ownership entities 118, control entities 120, and decision entities 122 may also be thought of as entities responsible for evaluating, or as systems responsible for providing evaluation 12 of ownership 118, control and agency 120, and decisions 122 that did or must have occurred within the manufacturing and distribution chain associated with a product.

By the same token, communications 124, financing 126, profits 128, and consequences 129 typically relate to business aspects of distribution and manufacturing of a product. Accordingly, entities, systems, or processes for evaluation 12 of such information may be assigned to entities or tasks regarded as decision entities 122, communications or systems 124, financing entities or systems 126, profit evaluation systems or entities 128, and consequence evaluation systems or entities 129.

Figure 5:
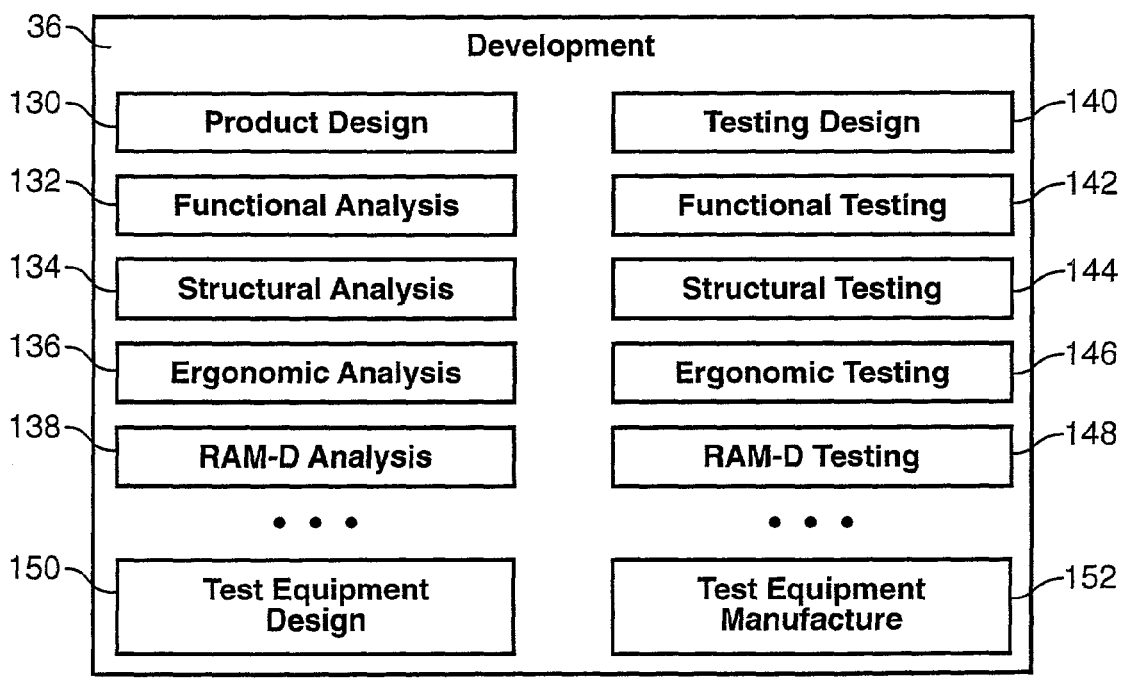
FIG. 5 is a schematic block diagram illustrating processes, which may be executed as software modules, or may represent software modules, in certain embodiments of an apparatus and method in accordance with the invention.

Referring to FIG. 5, a development system 36 or system entity 36 may include entities or systems, as appropriate for accomplishing various tasks, such as collection and evaluation of information, providing analyses, providing new product design specifications or modification methods, and so forth. In general, a development system 36 will provide the functions for a new or modified product that a manufacturer, original developer, or other associated with the product would have provided in the beginning. The same functions must be performed for a modified product or a modification to a product. Similarly, an independent solution, a product in itself, must reasonably undergo the development process to assure that it indeed meets its functional requirements and needs, as dictated by the flaws being corrected in a subject product.

A product design system 130 may focus on the design aspects, including graphics, pleasantness, and general functionality that may not be as technically oriented, but nevertheless provides an operational and pleasing product. Similarly, functional analysis systems 132 provide the analytical support for the proof of concept and operation of an improvement process or product. Structural analysis 134 may involve a mechanical analysis of a mechanical system or a software testing analysis of the integrity of data structures and their relationships within a software product (e.g. application, module, etc.). An ergonomic analysis system 136 provides the information required to assure that users can interact with a product suitably. For example, the ability of a user to read, distinguish, understand, interpret, and the like various icons, statements, text, labels, buttons, and the like on a computer screen may be extremely important. Interacting with mechanical or computer systems may greatly influence their utility.

Reliability, availability, maintainability, and durability analysis systems 138 may be implemented to assure that in time, between failures, the net downtime compared to the uptime, the total amount of service that a product requires, and the lifetime of a product are suitable.

In order to provide testing, tests must be designed. Therefore, a testing design system 140 may be implemented by persons, machines, programs, or the like in order to provide testing design that will prove a product improvement, product modification, or solution product as a reliable option. Similarly, functional testing systems 142 will actually implement tests as designed in order to assure that the functional features or functional operation of a solution product or product improvement operate correctly.

Likewise, structural testing systems 144 and ergonomics testing systems 146 may execute tests as designed in order to assure that the structural integrity, whether mechanically structurally or logically structurally evaluated, meet product requirements. Similarly, RAM-D testing systems 148 may assure the reliability, availability, maintainability, and durability of a product in accordance with expectations of meantime between failure, net fraction of up time or operational time compared to downtime, the total cost and effort associated with maintenance, and the overall lifetime of the product are suitable.

In certain embodiments of an apparatus and method in accordance with the invention, test equipment design systems 150 may be required in order to implement tests. Hardware and software must be designed in order to provide test conditions to meet testing design criteria. Likewise, test equipment manufacturer systems 152 may include people, machines, processes, and the like as needed to provide test equipment effective to conduct tests. Thus, test equipment may be manufactured in accordance with test equipment designs, in order to meet the conditions required to be imposed on a product during a test as designed.

Figure 6:
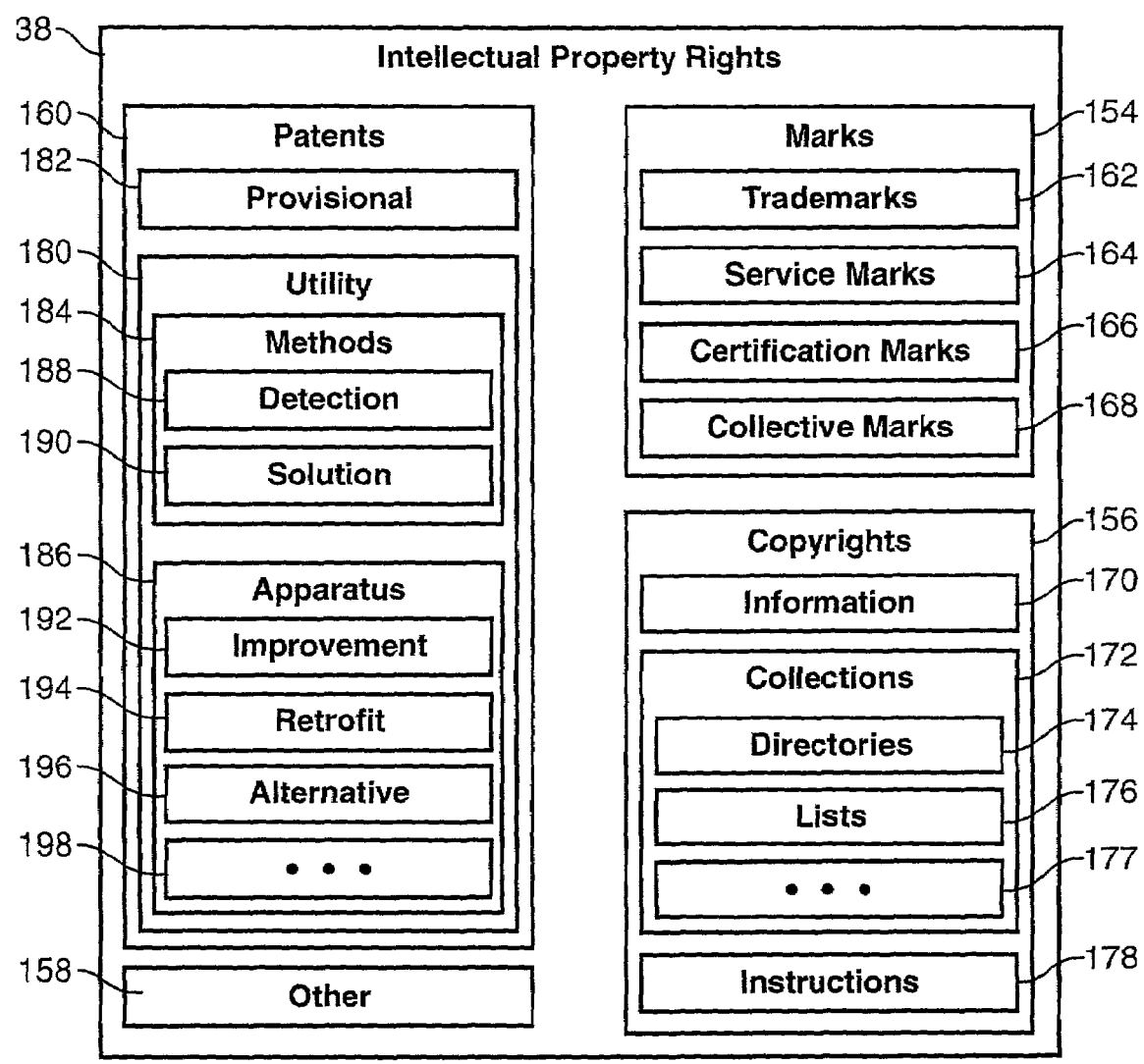
FIG. 6 is a schematic block diagram of processes required for securing rights in testing and solution processes in accordance with the invention.

Referring to FIG. 6, intellectual property rights systems 38 may include people, processes, equipment, information, programs, computers, and the like as necessary to secure intellectual property rights. Accordingly, mark systems 154 for securing trademarks, service marks, and the like may be implemented. Copyright systems 165 may be implemented and relied upon. Other systems 158 may be relied upon, including contracts, secrecy (e.g. trade secret protection), confidentiality, hiring, contracting, and the like in order to protect other intellectual property by other mechanisms. Also, patent systems 160 may be in place to regularly or systematically identify and harvest patentable inventions.

Various of types of marks 154 may include trademarks 162 or systems 162 for securing trademarks. In general, the illustration of FIG. 6 identifies certain intellectual property rights 38, and also fills the need of identifying intellectual property rights systems 38 effective for securing and enforcing those intellectual property rights 38. Thus, marks 154 and systems 154 for marks may include trademarks 162, service marks 164, certification marks 166, collective marks 168, and the like, as provided for in law.

Similarly, copyrights 156 and systems 156 configured to secure and enforce copyrights may be directed to information 170, collections 172, including directories 174, and lists 176, and so forth 177, as well as various sources of information such as instructions 178. For example, instructions 178 and systems 178 for capturing instructions may include software, instructions for modifying software, machine level instructions, software code for instructing a processor and a computer, and the like.

Patents 160, and systems 160 for securing patents may include provisional patent applications 182, and utility patent applications 180. Utility applications 180, or utility patents 180 may include patents directed to methods 184, whether detection methods 188 or solution methods 190, related to a subject product having a flaw to be detected and solved. Similarly, utility patents 180 may include apparatus, typically in hardware or software, which may include improvement patents 192, retrofit systems 194, alternative systems 196, or other combinations, improvements, and the like 198. Intellectual property 158 may include trade secrets or other intellectual property having value, and protected by some other mechanism. Typically, protections may be available by secrecy, contract, and the like, rather than by statutory registrations.

Figure 7:
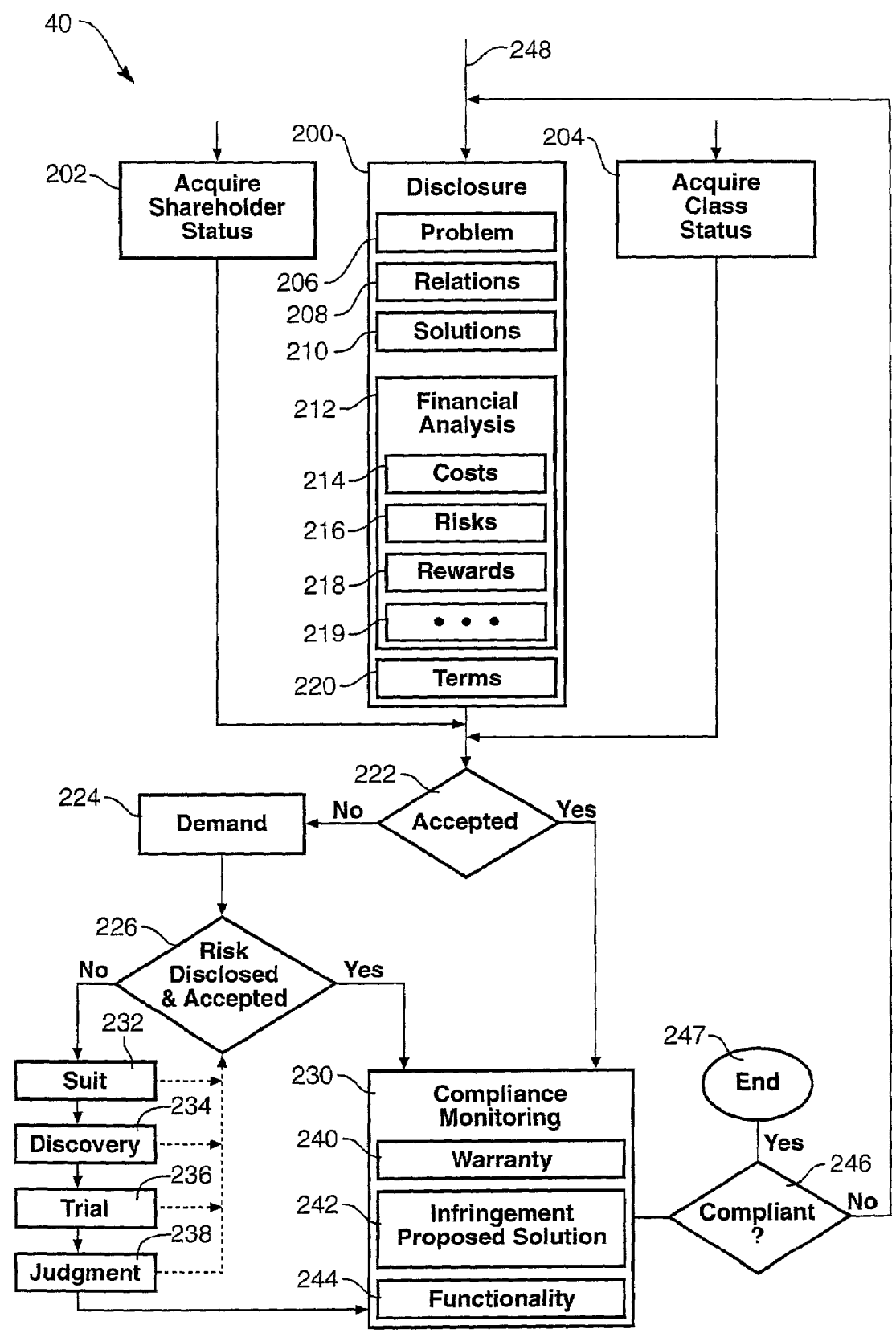
FIG. 7 is an alternative embodiment of a process in accordance with the invention for developing product design solutions and motivating the implementation thereof.

Referring to FIG. 7, a process 40 suitable for motivating a reluctant vendor or manufacturer of a defective product from implementing an improvement product or an improved product may be useful. In one embodiment, a motivational process 40 may include a disclosure 200 disclosing certain problems to a manufacturer or supplier. Thus, a provider of a defective product upon receiving disclosure 200 may be informed of information identifying or describing a problem 206. Likewise, relational information 208 may be provided in the disclosure 200. That is, identifying the relationship between a product, a problem, a liability, and a provider of the product may be important.

Accordingly, relations information 208 may be important as part of a complete and effective disclosure 200. Similarly, disclosure of solutions 210 may be critical to the understanding and the assurance of a potentially liable provider, thus assuring a limitation to liability and continuation of the problem. The presence of a solution 210 may be important to motivation to acknowledge a problem.

Additional information that may be provided in a disclosure 200 may be financial analysis 212. For example, costs 214 whether relating to products, or improvements, damages, solutions, testing, or the like may all be important in the motivation of a provider of a product. Similarly, identification of risk information 216 and reward information 218. For example, proper presentation of corrections may actually be a profitable enterprise for a responsible provider. By the same token, risks 216 and rewards 218 may be shared by various entities including providers of a product, evaluation entities 34, and development entities 36 responsible for providing either testing, solutions, or both.

Other information 219 may be provided as appropriate. In particular, certain terms 220 may be provided as a motivation. That is, measuring risks 216, rewards 218, profits, losses, liabilities, and the like, in terms 220 under which a solution may be obtained (e.g. detection, correction, or both) may be a motivating factor toward acknowledgment and correction of problems.

Before, after, or concurrently with a disclosure 200, an acquisition step 202 may acquire shareholder status for a developer or other entity giving a particular required status in a company. Similarly, an acquisition step 204 to acquire class status may be used. In fact, both acquisition processes 202, 204 may be used. A shareholder status acquisition 202 provides some small degree of ability to influence from inside. Meanwhile, acquisition 204 of class status as a customer, or other user, or damaged party using a defective product may provide a cause of action against a company that refuses to take responsibility for faulty products.

If the disclosure 200, and ultimately the provided terms 220, are accepted by a company responsible for a defective product, then a test 222 proceeds forward affirmatively toward compliance monitoring 230. Otherwise, if the test 222 results in non-acceptance of the disclosure 200, terms 220, subsequent licensing, or the like, then a demand 224 may be lodged. Demanding 224 a settlement or acceptance of a settlement offer may result in an obligation on a company to disclose and accept the risk that the knowledge imparted by the disclosure 200 puts into the company at risk. If the risk is disclosed and accepted, then a test 226 moves toward compliance monitoring 230, with respect to the disclosure 200.

On the other hand, instance of an unmotivated company that does not agree with the assessment of its liability may choose to stonewall against the disclosure 200, or even threaten, resulting in a suit 232. The suit may also imply an additional responsibility on a company to identify the fact that it is involved in litigation over the issue at hand. Again, if the risks have not been disclosed and accepted by the company, then additional causes of action exist in the suit 232 against the non-disclosing company.

In each case, if the test 226 results in proper acknowledgment to shareholders of the risks and existence associated with the outstanding liability, compliance monitoring 230 may be appropriate. In each case, however, to the extent that a risk is not disclosed and accepted, fully informing shareholders, then a suit 232 may be followed by discovery 234 followed by trial 236, and ultimately a judgment 238.

In any event, the progress, if not adequately reported, may add to additional risk, which must be reported and disclosed, returning repeatedly to the test 226. A judgment 238 results in compliance monitoring 230 with respect to the judgment. Compliance monitoring 230 may include monitoring of warranties by a company with respect to its performance in dealing with the information from the disclosure 200, or with respect to any aspect of the legal actions 232-238.

Meanwhile, issues of infringement 242 may be monitored, since alternative solutions proposed by a company, and outside those developed by an independent development entity 36 may actually fail, resulting in a temptation to use an infringing solution. Meanwhile, functionality 244 of any proposed solution may actually be in question. That is, a development entity 36 may provide a solution, and a company responsible for the product may develop an alternative. Nevertheless, if the alternative is not fully adequate, then it is not a true alternative. Thus, functionality monitoring 244 may be a part of compliance monitoring 230 of the activities of a company.

If a company remains compliant, then a test 246 for compliance affirmatively answered maintains stable, or ends in the test 247 and process 40. A negative response to the test 246 for compliance may result in additional disclosures 200 relative to the risks being run by non-compliance, looping through the entire motivation process again.

All of the information discussed with respect to FIGS. 3-6, and the entities and processes associated with the FIGS. 1-7 may be relied upon as appropriate during any and each of the steps of the process 40.

Figure 8:
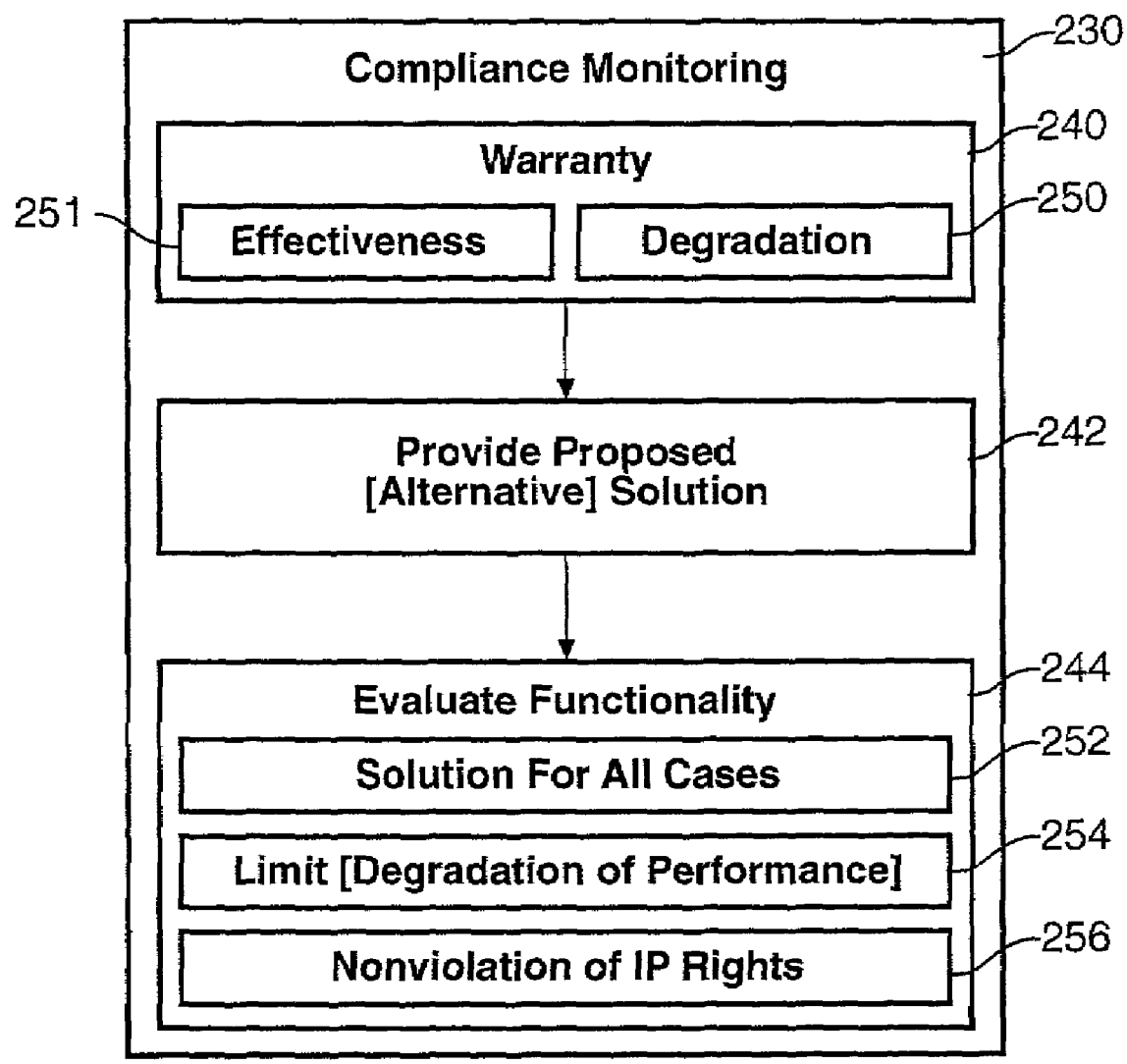
FIG. 8 is a schematic block diagram of one embodiment of a process, which may be embodied as data structures, for monitoring compliance of vendors of defective products corrected in accordance with the invention.

Referring to FIG. 8, one alternative of embodiment of compliance monitoring 230 may include compliance monitoring of warranty provisions 240. That is, a warranty by a provider of a defective product, as a result of negotiation, settlement, or the like, with respect to a motivation process 40, licensing process 24, or the like may be warrantied 240 against degradation 250 of performance, and affirmatively in favor of effectiveness 251 of a product.

For example, warranties 240 may be made providing that no degradation of service, operational parameters, or the like will occur. Similarly, the effectiveness to do the functional job may be warranted. Thus, warranty monitoring 240 may involve monitoring 250 of product performance to test for degradation, as well as monitoring 251 of effectiveness to be able to properly operate and perform the function for which the product is intended.

Similarly, a provider of a defective product, or a formerly defective product, may contract, covenant, or be ordered to provide 242 a proposed solution. The proposed solution provided 242 may be that from the developer 36, or may be, optionally, an alternative solution proposed by the product provider itself.

As part of compliance monitoring 230, a proposed solution, subject to the warranty provisions 240, may be evaluated 244. For example, evaluations determining whether the solution fits all cases 252, or a test for all cases 252 may be part of the evaluation 244 functionality. Similarly, evaluation 254 of limits, such as, for example, degradation of performance as one option, may be significant. Similarly, evaluation 256 for non-violation of intellectual property rights may also be a part of evaluation 244 of the functionality of the proposed alternative solution optionally proffered by a supplier of a formerly defective product.

Figure 9:
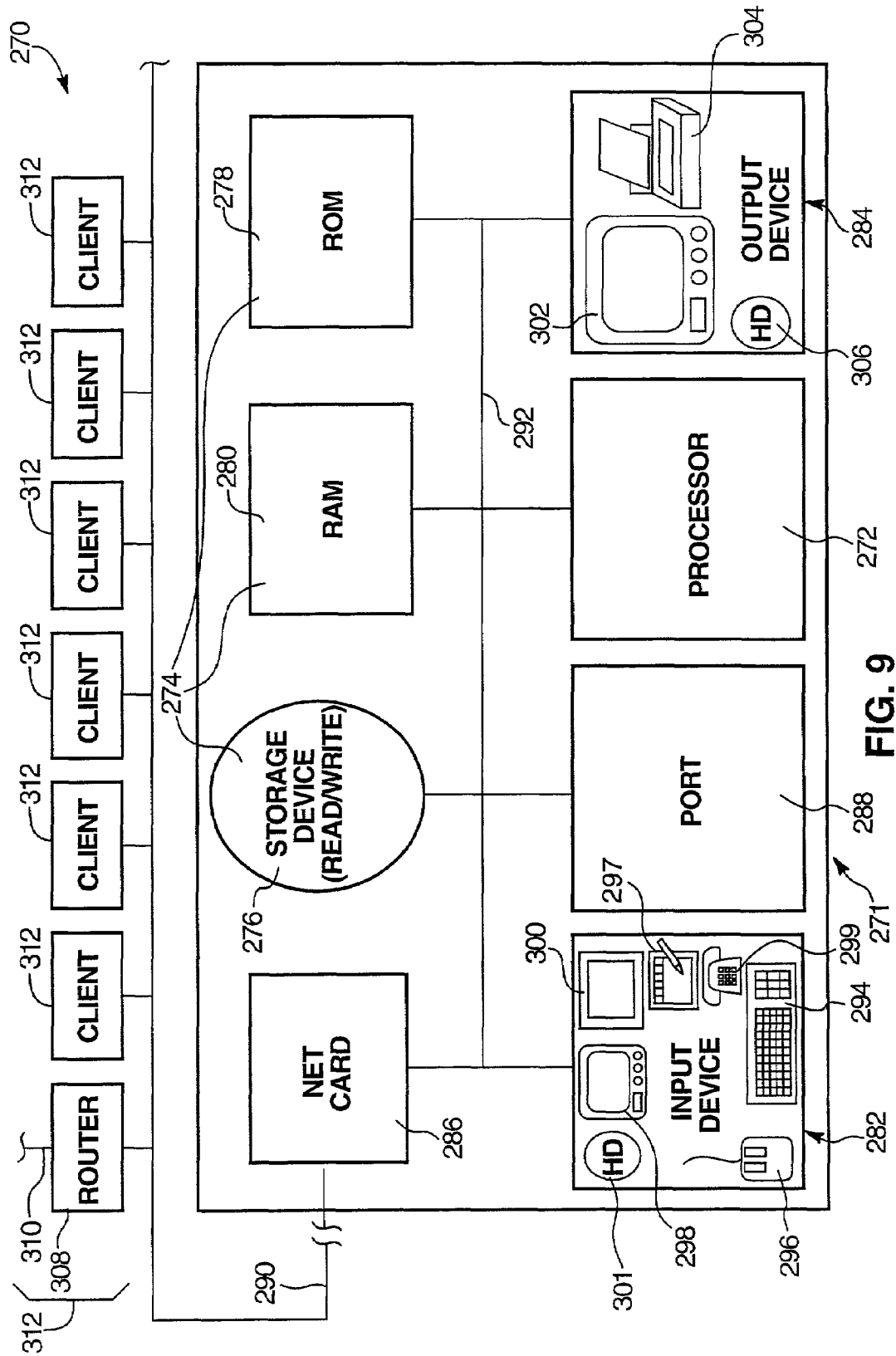
FIG. 9 is a schematic block diagram of one embodiment of a hardware suite suitable for implementing an apparatus and method in accordance with the invention.

Referring to FIG. 9, an apparatus 270 may implement the invention on one or more nodes 271, (client 271, computer 271) containing a processor 272 (CPU 12). All components may exist in a single node 271 or may exist in multiple nodes 271, 312 remote from one another. The CPU 272 may be operably connected to a memory device 274. A memory device 274 may include one or more devices such as a hard drive or other non-volatile storage device 276, a read-only memory 278 (ROM) and a random access (and usually volatile) memory 280 (RAM/operational memory).

The apparatus 270 may include an input device 282 for receiving inputs from a user or another device. Similarly, an output device 284 may be provided within the node 271, or accessible within the apparatus 270. A network card 286 (interface card) or port 288 may be provided for connecting to outside devices, such as the network 290

Internally, a bus 292 may operably interconnect the processor 272 memory devices 274, input devices 282, output devices 284, network card 286 and port 288. The bus 292 may be thought of as a data carrier. As such, the bus 292 may be embodied in numerous configurations. Wire, fiber optic line, wireless electromagnetic communications by visible light, infrared, and radio frequencies may likewise be implemented as appropriate for the bus 292 and the network 290.

Input devices 282 may include one or more physical embodiments. For example, a keyboard 294 may be used for interaction with the user, as may a mouse 296 or stylus pad. A touch screen 298, a telephone 299, or simply a telephone line 299, may be used for communication with other devices, with a user, or the like. Similarly, a scanner 300 may be used to receive graphical inputs which may or may not be translated to other character formats. The hard drive 301 or other memory device 301 may be used as an input device whether resident within the node 271 or some other node 312 (e.g., 312a, 312b, etc.) on the network 290, or from another network 310.

Output devices 284 may likewise include one or more physical hardware units. For example, in general, the port 288 may be used to accept inputs and send outputs from the node 271. Nevertheless, a monitor 302 may provide outputs to a user for feedback during a process, or for assisting two-way communication between the processor 272 and a user. A printer 304 or a hard drive 306 may be used for outputting information as output devices 284.

In general, a network 290 to which a node 271 connects may, in turn, be connected through a router 308 to another network 310. In general, two nodes 271, 312 may be on a network 290, adjoining networks 290, 310, or may be separated by multiple routers 308 and multiple networks 310 as individual nodes 271, 312 on an internetwork. The individual nodes 312 (e.g. 271, 312, 314) may have various communication capabilities.

In certain embodiments, a minimum of logical capability may be available in any node 312. Note that any of the individual nodes 271, 312, 314 may be referred to, as may all together, as a node 271 or a node 312. Each may contain a processor 272 with more or less of the other components 14-44.

A network 290 may include one or more servers 314. Servers may be used to manage, store, communicate, transfer, access, update, and the like, any practical number of files, databases, or the like for other nodes 312 on a network 290. Typically, a server 314 may be accessed by all nodes 271, 312 on a network 290. Nevertheless, other special functions, including communications, applications, directory services, and the like, may be implemented by an individual server 314 or multiple servers 314.

In general, a node 271 may need to communicate over a network 290 with a server 314, a router 308, or nodes 312. Similarly, a node 271 may need to communicate over another network (310) in an internetwork connection with some remote node 312. Likewise, individual components 12-46 may need to communicate data with one another. A communication link may exist, in general, between any pair of devices.

Figure 10:
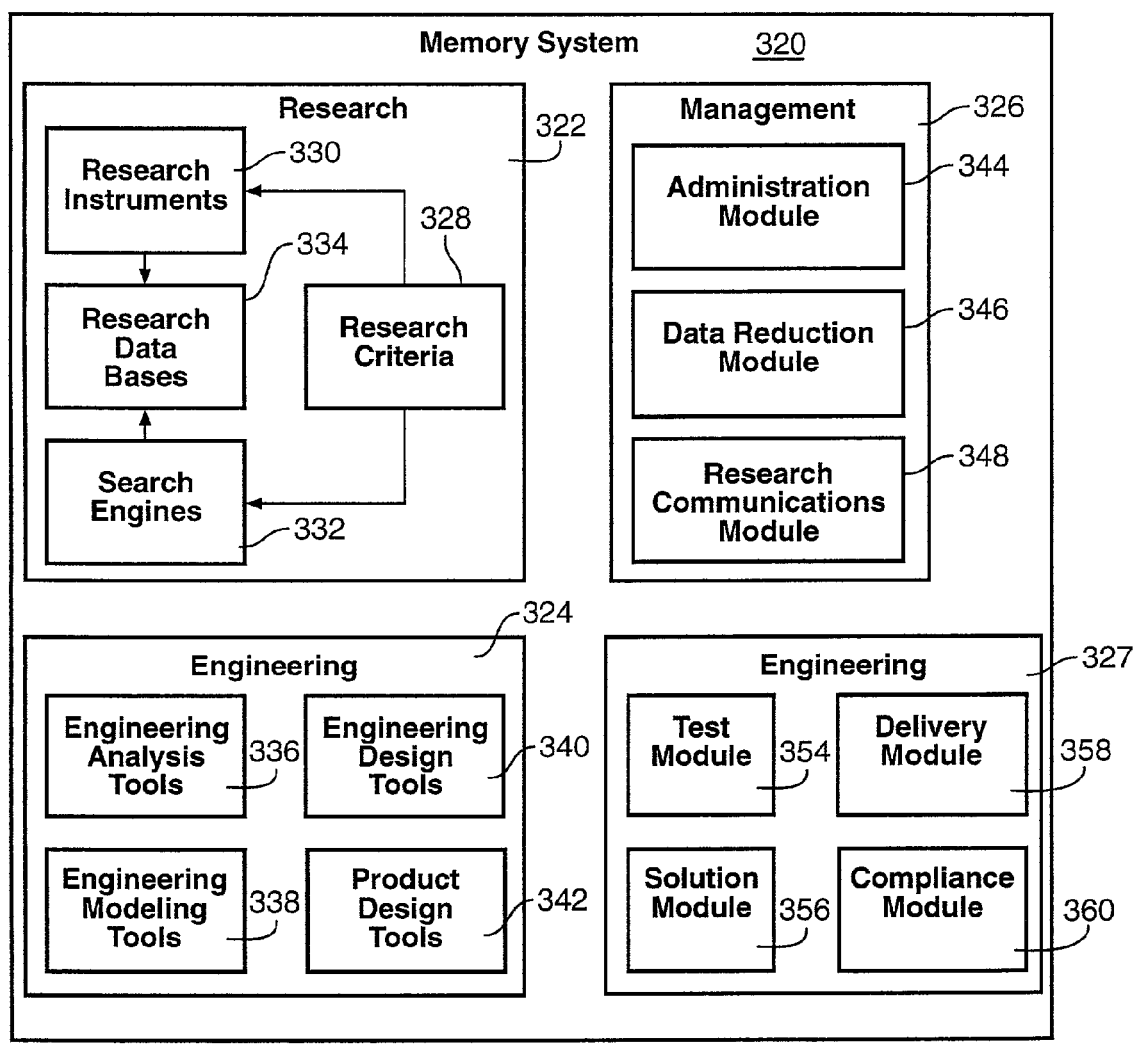
FIG. 10 is a schematic block diagram of one embodiment of a process, which may be embodied as software, firmware, or hardware modules, for implementing research, engineering, administration, and other functions of a process in accordance with the invention.

Referring to FIG. 10, a memory system 320 may include one or more physical entities containing information useable by persons or a computer. In one embodiment, a memory system 320 may include one or more physical memory devices associated with processors or computer-readable otherwise in order to feed information into a processor. Thus, in general, a memory system 320 may store executables and operational data for use by a computer in providing analysis, and outputs having utility in accordance with the invention. In certain embodiments, a memory system 320 may store research information 322. The research processes 320 or research module 320 may include research information, and research executables for supporting or effecting research. Similarly, an engineering module 324, whether physically a single entity or whether only logically related separate entities, may provide engineering.

A management module 326, which may be made up of other modules, logically related, whether or not physically contiguous in any portion of the memory system 320. In general, any module 322, 324, 326, 327 may be embodied as any number of executable instructions at any level of instruction. For example, a single, machine-level instruction, or half a million lines of source code may each serve a role as some type of a module. Similarly, data compositions may be provided as operational data for use in execution by a processor. Such a combination of data may be a module.

A product module 327 may embody the portions of a product improvement process or offering in order to rectify flaws in a previously marketed product. Accordingly, a product module 327 may be made up of separate modules that may be embodied in a computer readable medium in order to be distributed, or to facilitate distribution of product testing, product repair, or other product-related information. The modules making up the product module 327 may be fully executable or fully operable on a computer.

Alternatively, portions of the product module 327 may be exclusively operable on a computer. In other embodiments, portions of the product module 327 may be software elements provided for use by a technician or user in implementing methods in accordance with the invention to correct or improve a product previously sold as a faulty or defective product.

A research module 322 may include research criteria 328. Research criteria 328 may include any information regarded as significant, important, required, or helpful in either making investigations or in operating experiments and tests, or even in simply inquiring of search engines. Accordingly, the research module 322 may include processes and systems for research instruments 330. As with other illustrations herein, the memory system 320 may also be thought of as a model or illustration of systems for providing the information and elements that are identified herein.

For example, research instruments 330 may include hardware, software, or both for conducting tests, controlling tests, or evaluating tests. Similarly, setting up tests, designing tests, or the like may also be included in research instruments 330.

Nevertheless, the research instruments module 330 may also be thought of as one representation of information, software, programming, or the like effective to operate or interact with research instrumentation. Similarly, each block within the memory system 320 illustrated in FIG. 10 may be interpreted as the system for providing information, or as the software, the hardware, the code, or any of the above. Similarly, each module within the memory system 320 may also be considered as the information itself.

Accordingly, the research module 322 may include search engines 332 for searching other data or databases based on research criteria 328. Thus, individual or independent research instruments 330 may provide new information, while the search engines 332 may search for previous obtained information of others. Thus, the research database module 334 may receive information both from the research instruments 330 and the search engines 332, in accordance with the research criteria 328.

Research criteria may include products, product specifications, operations, advertising information, claims, functionality, common uses, and the like. Research instruments 330 may be configured to test or evaluate any fact for its veracity. Research instruments 330 may also be implemented to test a product for performance in accordance with advertised, regulated, standardized, promised, or expected performance factors as identified in research criteria 328.

An engineering module 324 may include engineering analysis tools 336, engineering modeling tools 338, engineering design tools 340, product design tools 342, and the like. In general, engineering analysis tools 336 may be thought of as analytical processes, programs, data, hardware, or any combination thereof that may be effective to evaluate the performance and function of a product in question.

Engineering modeling tools 338 may be used to predict performance of such a product based on measurable or other identifiable parameters. Thus, engineering modeling tools 338 maybe thought of as predicting performance. Engineering analysis tools 336 may be thought of as determining whether or not a device performs in a particular way, determining the failure modes and effects, and the like.

Meanwhile, engineering design tools 340 may be thought of as tools relied upon by a developer 36 or development entity 36 in designing a product. Accordingly, information, computer programs, hardware, and the like, may all be a part of the engineering design tool module 340 available in the engineering module 324 as needed to prepare a solution for a defective product or an effective test system for identifying defective products.

Product design tools 342 may sometimes be confused with engineering design tools 340. Nevertheless, product design processes are typically considered to be those associated with the acceptability or usability of a product with respect to a user. Engineering design tools 340 are usually regarded as those associated with strict functionality within some specification, which is typically independent of human users, but may relate to function, strength, electrical parameters, data parameters, and so forth.

A management module 326 may include an administrative module 344 corresponding to administration of the research module 322, the engineering module 324, and possibly the product module 327. In general, administration 344 is a major part of tracking all information, feeding information into an analysis programs, retrieving outputs, and so forth.

The management module 326 may include a data reduction module 346 containing analytical processes and systems effective to reduce data to information usable in making decisions.

Similarly, a research communications module 348 may provide the functionality required in order to communicate between various modules 322, 324, 326, 327 or within those modules. For example, information must be retrieved, distributed, analyzed, returned, and so forth in order to control systems, collect information, distribute required information to users thereof, and the like.

A product module 327, as with all the modules 322, 324, 326, 327, may be embodied in any suitable configuration in order to accomplish the logical purpose thereof, regardless of physical location of information or executable commands at any given time. Nevertheless, a product module 327 may include a test module 354, a deliverable provided to or capable of being provided to a user or vendor of a faulty product in order to test such products to determine whether or not a subject flaw exists in the product.

Similarly, a solution module 356 may be optional, and may be distributed to a vendor, user, or others associated therewith in order to provide a solution solving a discovered flaw, discovered as a result of the test module 354 or by other mechanisms. That is, for example, testing and analysis may show that a particular serial number identifies a product having a flaw as a result of being manufactured by a specific process or at a specific location.

Accordingly, a test module 354 may not be required if certain faulty products may be identified readily from some other criteria. Nevertheless, a solution module 356 may typically follow a test module 354 identifying a product as faulty. Accordingly, a solution module 356 may be embodied in computer instructions effective to correct the hardware or software flaw detected in the product.

Similarly, a delivery module 358 may include any or all of those processes, information, and things required to deliver a test module 354, a solution module 356, or both to an appropriate destination. For example, a delivery module 358 may embody any or all, or any subset of all of the required processes, steps, and things required in order to provide information and services to an entity affected by a faulty product.

Typically, a delivery module 358 may be used to inform perspective recipients of the existence, value, and criteria associated with the test module 354. Similarly, the delivery module 358 may embody processes and methods for identifying the significance, requirement, and availability of the solution module 356. Thus, the delivery module 358 may be an engine operating over the Internet to download software for the test modules 354, or solution modules 356 made available with respect to a particular product.

By contrast, the delivery module 358 may be conventional mailings of diskettes to users or purchasers identified with sales of a defective product. Various mechanisms for delivery module 358 may be embodied as required to obtain effective coverage of the distribution of test modules 354, solutions modules 356, or both.

The compliance module 360 may be embodied in several configurations to operate over conventional communication systems, networks, the Internet, on individual computers, or through other information collection systems. In general, a compliance module 360 may provide information calculated to determine compliance of a vendor, supplier, manufacturer, or other entity in the supply chain, responsible for defective products, in order to determine whether or not the correct licensed solution, infringing solution, or an inadequate and faulty solution is being provided.

In certain embodiments, a compliance module 360 may simply be a computer program operating on a computer in a test laboratory to which selected samples of products (e.g. test modules 354, solution modules 356, or both 354,356) may be sent in order to do a sampled analysis for compliance. Thus, a memory system 320 consolidated on a single memory device, on a diskette, on a computer readable medium of any type, in a computer system, distributed throughout multiple computer systems throughout the world, or in any suitable configuration may provide research 322, engineering 324, management 326, and product 327 effective to identify and remedy faulty products provided from a product supply chain from a manufacturer to users. From the above discussion, it will be appreciated that the present invention provides a method and apparatus for development of solutions to product defects by independent developers as third parties independent from purchasers and sellers of the products. A method and apparatus for improvement of computer-related products by an independent developer may solve problems in hardware or software inadvertently, negligently, or intentionally left in products marketed by a vendor. An independent developer may procure access to a product, develop a testing regimen for functionality of the product, and perform evaluations to identify sources of any operational defects found.

Accordingly, the developer may then provide a generalized testing regimen to test instances of product provided by a vendor, identify those containing the flaw, and may optionally provide a solution to the flaw, where practicable. The independent developer may obtain intellectual property rights in the testing, solution or both for the product. Thus, by notifying a vendor, an independent developer may become a supplier of testing or solution systems, motivating a supplier by one of several mechanisms. The developer may obtain a legal status with respect to the vendor by becoming a customer or user, in order to provide motivation to a recalcitrant vendor not designed to take responsibility for defects known and continued in marketed products.

The present invention may be embodied in other specific forms without departing from the essential characteristics thereof. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for improvement of computer-related products by an independent third party, the method comprising:
   procuring a product identified with a vendor and configured to provide a processing functionality to a user, the product known to have faulty and non-faulty instances thereof;
   testing the product, by the third party, for the functionality and for a defect in operation;
   evaluating, by the third party, the testing to determine the source of the defect;
   developing, by the third party, a testing regimen configured to evaluate instances of the product to reliably identify faulty instances of the product, the faulty instances having the defect; and
   implementing the testing regimen to test the product to identify the faulty instances thereof.

2. The method of claim 1, further comprising developing, by the third party, a solution for the defect, the solution being effective to return the product to service without the defect.

3. The method of claim 1, wherein the defect further comprises a failure of the product due to a failure of a component selected from a hardware component and a software component of the product.

4. The method of claim 1, further comprising developing, by the third party, an assessment of the defect providing a severity profile reflecting the extent to which the product has been distributed.

5. The method of claim 1, further comprising:
   notifying the vendor of the defect; and
   developing, by the third party, a liability profile reflecting the extent to which the product has been distributed with knowledge of the defect.

6. The method of claim 1, further comprising:
   providing, by the third party a solution configured to correct the defect in the product, the solution being selected from replacing the product, modifying the product, providing to an owner an instruction for curing the defect, and publishing a solution to be implemented by an owner of the product.

7. The method of claim 1, further comprising:
   obtaining intellectual property rights in the testing regimen; and
   offering to the vendor a license to the intellectual property rights.

8. The method of claim 1, further comprising:
   obtaining, by the third party, a status providing a legal relationship imposing a duty on the vendor with respect to the third party;
   providing to the vendor information identifying the defect and the existence of a solution; and
   demanding of die vendor, by the third party, to provide a cure far the defect in substantially all faulty instances of the product containing the defect.

9. The method of claim 1, further comprising:
   entering into an agreement, by the vendor and the third party to assure curing of the defect in the faulty instances;
   monitoring compliance of the vendor in curing the defect in accordance with obligations of the vendor under the agreement; and
   providing, by the third party, motivation to the vendor to meet the contracted obligations.

10. The method of claim 1, further comprising, providing motivation to the vendor to acknowledge and cure the defect by taking steps directed toward obtaining a legal judgment against the vendor.

11. The method of claim 1, wherein providing a solution further comprises contracting with the vendor to provide a solution to be distributed by the vendor.

12. The method of claim 1, wherein:
   the product is a hardware device;
   the defect is embodied in defective hardware components in the hardware device; and
   the solution is embodied in a software program, executable on a processor associated with the hardware device, effective to circumvent the defect during operation of the hardware device.

13. The method of claim 1, wherein:
   the product is embodied in a computer-readable medium and comprises product instructions executable on a processor;

the defect is embodied in defective logic; and the solution is embodied in a software solution program, executable on a processor and effective to circumvent the defect during execution of the product logic.

14. The method of claim 1, further comprising:

notifying the vendor of the defect;

proposing to provide a solution, developed by the third party independently from the vendor, to the vendor for distribution;

contracting to provide the solution.

15. The method of claim 1, further comprising:

providing, by the vendor, an alternative solution for the defect;

warranting, by the vendor, performance of the product implemented with the alternative solution;

evaluating, by the third party, operation of the product implemented with the alternative solution to determine completeness of the alternative solution in resolving previously identified classes of instances of the defect, and compliance with intellectual property rights of the third party.

16. A method for improvement of products by an independent third party, the method comprising:

procuring a product identified with a vendor and having functionalities delivered thereby, the product known to have faulty and non-faulty instances thereof;

testing the product, by the third party, for the fimotion-alities and for a defect in operation;

providing test data reflecting the defect;

evaluating, by the third party, the test data to determine the source of the defect;

developing, by the third party, a testing regimen configured to evaluate instances of the product to reliably identify faulty instances of the product, the faulty instances having the defect;

providing, by the third party, a solution for the defect, the solution being effective to return the product to service without the defect.

17. The method of claim 16, wherein the solution is selected from replacing the product, modifying the product, providing to an owner an instruction for curing the defect, and publishing a solution to be implemented by an owner of the product.

18. The method of claim 17, further comprising:

obtaining intellectual property rights in the testing regimen; and offering to the vendor a license to the intellectual property iights.

19. The method of claim 18, further comprising:

obtaining, by the third party, a status providing a legal relationship imposing a duty on the vendor with respect to the third party;

providing to the vendor information identifying the defect and the existence of a solution;

demanding of the vendor, by the third party, to provide a cure forte defect in substantially all faulty instances of the product; and contracting with the vendor to assure curing of the defect in the faulty instances.

20. The method of claim 19, further comprising:

monitoring compliance of the vendor in curing the defect in accordance with contracted obligations of the vendor; and providing motivation to the vendor to meet the contracted obligations.

21. The method of claim 19, wherein providing motivation further comprises taking steps directed toward obtaining a legal judgment against the vendor.

22. The method of claim 21, wherein contracting further comprises providing to the vendor a solution.

23. The method of claim 22, wherein:

the product is a hardware device;

the defect is embodied in defective hardware components in the hardware device; and the solution is embodied in a software program, executable on a processor associated with the hardware device, effective to circumvent the defect during operation of the hardware device.

24. A method for third party product improvement, the method comprising:

identifying a product related to computes processing of information, the product being provided by a first party for use by second parties and having faulty and non-faulty instances thereof;

providing, by a third party, unrelated to the first party, a testing application, executable by a computer processor for testing the product;

executing the testing application to test functional performance of the product;

determining a failure mode of the product corresponding to the faulty instances thereof;

obtaining, by the third party, intellectual property rights in the testing application;

providing, by the third party, a software solution, executable by a computer processor to reconfigure the product in a manner selected to cure the failure mode;

motivating a supplier of the product to obtain rights in the software solution; and distributing of the software solution.

25. A method for third-party improvement of products, the method comprising:

obtaining a product provided by a first party to a second party for performing a function on behalf of the second party, the product known to have faulty and non-faulty instances thereof;

testing, by a third party, the functional perfonnance of the product;

identification, by the third party, of a flaw in the product, corresponding to the faulty instances and for which the first party is liable;

providing notification to the first party; and providing, by the third patty, a solution effective to cure the flaw.

26. The method of claim 25, wherein providing a solution fdrther comprises providing the solution to the first patty.

27. The method of claim 25, wherein providing a solution further comprises providing the solution to the second party.

28. The method of claim 25, wherein:

the product is selected from a processor and an executable configured to execute on a processor, and the method further comprises providing a computer readable medium storing executable and operational data structures thereon, the data structures comprising at least one of a testing application for determining the presence of the flaw and a software solution effective to substantially remove the effects of the flaw in the use of the product.

* * * * *

UNITED STATES PATENT AND TRADEMARK OFFICE
CERTIFICATE OF CORRECTION

| | | |
|---|---|---|
| PATENT NO. | : 7,251,752 B2 | Page 1 of 1 |
| APPLICATION NO. | : 09/969176 | |
| DATED | : July 31, 2007 | |
| INVENTOR(S) | : Phillip M. Adams | |

It is certified that error appears in the above-identified patent and that said Letters Patent is hereby corrected as shown below:

In claim 8, line 7, please delete "die", please insert therefor --the--.

In claim 25, line 7, please delete "perfonnance", please insert therefor --performance--.

In claim 26, line 2, please delete "fdrther", please insert therefor --further--.

Signed and Sealed this

Nineteenth Day of August, 2008

JON W. DUDAS
*Director of the United States Patent and Trademark Office*

UNITED STATES PATENT AND TRADEMARK OFFICE
CERTIFICATE OF CORRECTION

PATENT NO. : 7,251,752 B2  Page 1 of 1
APPLICATION NO. : 09/969176
DATED : July 31, 2007
INVENTOR(S) : Phillip M. Adams It is certified that error appears in the above-identified patent and that said Letters Patent is hereby corrected as shown below:

Column 22, In claim 8, line 36, please delete "die", please insert therefor --the--.

Column 24, In claim 25, line 41, please delete "perfonnance", please insert therefor --performance--.

Column 24, In claim 26, line 51, please delete "fdrther", please insert therefor --further--.

This certificate supersedes the Certificate of Correction issued August 19, 2008.

Signed and Sealed this

Sixteenth Day of September, 2008

JON W. DUDAS
*Director of the United States Patent and Trademark Office*